US005792362A

United States Patent [19]
Ruggles, II

[11] Patent Number: 5,792,362
[45] Date of Patent: *Aug. 11, 1998

[54] METHOD AND APPARATUS FOR CLEANING SWIMMING POOLS

[76] Inventor: Arthur E. Ruggles, II. 124 Northshore Dr., Andersonville, Tenn. 37705

[*] Notice: This patent issued on a continued prosecution application filed under 37 CFR 1.53(d), and is subject to the twenty year patent term provisions of 35 U.S.C. 154(a)(2).

[21] Appl. No.: 709,477

[22] Filed: Sep. 5, 1996

[51] Int. Cl.$^6$ .................................. C02F 1/24
[52] U.S. Cl. ............... 210/703; 210/169; 210/416.2; 210/712
[58] Field of Search ................ 210/169, 416.2, 210/703, 706, 707, 712, 805

[56] References Cited

U.S. PATENT DOCUMENTS

| | | | |
|---|---|---|---|
| 3,986,954 | 10/1976 | George et al. | 210/712 |
| 4,304,740 | 12/1981 | Cernoch | 210/169 |
| 4,769,154 | 9/1988 | Saylor et al. | 210/707 |
| 4,874,509 | 10/1989 | Bullock | 210/169 |
| 5,156,745 | 10/1992 | Cairo, Jr. et al. | 210/712 |
| 5,160,620 | 11/1992 | Lygren | 210/703 |
| 5,492,630 | 2/1996 | Roshanravan et al. | 210/712 |
| 5,516,434 | 5/1996 | Cairo, Jr. et al. | 210/712 |

Primary Examiner—Jay H. Woo
Assistant Examiner—Betsey J. Morrison
Attorney, Agent, or Firm—Richard M. Kessler

[57] ABSTRACT

A method for cleaning unwanted materials from a swimming pool having water and a water recirculation filtration system wherein the water circulates through the recirculation filtration system. The method comprises the steps of placing microscopic air bubbles having a size of in the range of from abut 0.1 mm to about 0.001 mm into water circulating through the water recirculation filtration system, circulating the microscopic air bubbles into the water of the swimming pool for a period of time sufficient to precipitate onto unwanted materials in the pool, allowing the materials to float to the top of the surface of the water, and removing the unwanted materials from the surface of the pool. An apparatus for accomplishing the method is also disclosed.

4 Claims, 4 Drawing Sheets

METHOD AND APPARATUS FOR CLEANING SWIMMING POOLS

FIELD OF THE INVENTION

The present invention relates to methods and apparatus for cleaning swimming pools. More specifically, the present invention relates to methods and apparatus which may be used to clean swimming pools with a minimum of effort on the part of the pool owner or caretaker.

BACKGROUND OF THE INVENTION

During the past forty years, the swimming pool has become a fixture in the backyards of increasing numbers of American homes. The benefits of having ready access to a pool in the home backyard are numerous and well known. However, in most cases, the cleaning of a pool is a tedious process which takes large amounts of time and/or money.

There are three distinct areas of concern with respect to the cleaning of pools. The water of the pool must be maintained in a clean condition so that all members of the family can safely swim. This is usually taken care of by a pool filtration and recirculation system in conjunction with the use of chlorine or ozone. The surface of a pool generally collects leaves, small insects, twigs and the like. These items float on the surface of the pool for a period of time before becoming water logged and sinking. The bottom of the pool generally collects those leaves and the like which sink as well as dust and dirt which sink to the bottom of the pool. Thus, there are two distinctly different problems to be solved in cleaning a pool.

A skimmer is used to clean the surface of a pool. Skimmers can be either manual or automatic. The manual skimmer comprises a net on the end of a pole. The net is used to remove any floating material on the surface of the pool. The manual skimmer is a cheap and effective means for removing such unwanted materials. The more expensive automatic skimmer comprises one or more pool-side components connected to the filtration system. Debris on the surface of the pool is sucked into these components and separated by a strainer internal to the component.

A pool vacuum comprises a suction hose attached to a fairly large brush which is used for cleaning the bottom of a pool. The user stands on the side of the pool and passes the brush over the bottom surface of the pool by means of a pole also attached to the brush. The debris is then sucked into the vacuum system. Since the brush must be passed over the entire bottom of the pool to clean it, the process of using a brush is extremely time consuming. In addition, it is often difficult to reach the entire bottom of the pool from one side and the user must continuously move around the side of the pool to complete the cleaning process. Automatic pool vacuum systems are available that randomly move over the bottom of the pool and clean it after some significant time. These systems are not suitable for all pools.

There is a need for an inexpensive and convenient means for cleaning the bottom of a pool of unwanted debris. There is also a need for such a means which is readily installed by the pool user.

Therefore, it is an object of the present invention to provide a method and apparatus for cleaning the bottom of a pool of unwanted debris.

It is another object of the present invention to provide such a system which is relatively inexpensive and easy to install.

It is a further object of the present invention to provide such a system which is relatively easy to maintain and functions in an automatic manner.

Consideration of the specification, including the several figures to follow, will enable one skilled in the art to determine additional objects and advantages of the invention.

SUMMARY OF THE INVENTION

Having regard to the above and other objects and advantages, the present invention generally provides for a method for cleaning unwanted materials from a swimming pool having water and a water recirculation filtration system wherein the water circulates through the recirculation filtration system. The method comprises the steps of placing microscopic air bubbles having a size of in the range of from about 0.1 mm to about 0.001 mm into water circulating through the water recirculation filtration system, circulating the microscopic air bubbles into the water of the swimming pool for a period of time sufficient to precipitate the microscopic air bubbles onto unwanted materials in the pool, allowing the materials to float to the top surface of the water, and allowing the unwanted materials to be removed from the surface of the pool via the automatic skimmers.

In the use of the method according to the present invention, the microscopic bubbles are of a size and concentration (number per cubic meter) such that they are not visible to those using the pool. Therefore, there is no aesthetic effect on the use of the pool by the use of the present method. An automatic skimmer can remove the debris as it floats to the surface. In the alternative, the floating debris may be easily removed by a manual skimmer in the morning. In either case, the result is a clean pool.

In a preferred embodiment of the present invention, the microscopic air bubbles have a size in the range of from about 0.01 mm to about 0.001 mm. In a further preferred embodiment of the present invention, the microscopic air bubbles are circulated into the water of the swimming pool for a period of time in the range of from about three hours to about twelve hours and a more preferred range of from about six hours to about twelve hours. In another preferred embodiment of the present invention, the microscopic air bubbles are placed into the water circulating through the water recirculation filtration system after the circulating water passes through the water recirculation filtration system and before the water is circulated back into the pool.

The present invention also provides for an apparatus for cleaning unwanted materials from a swimming pool having water and a water recirculation filtration system wherein the water circulates through the recirculation filtration system. The apparatus comprises an air source, a nozzle having one end penetrating the circulating water, and a conduit connecting the nozzle to the air source. The air source supplies air to the nozzle through the conduit. The one end of the nozzle is of a sufficient size to produce microscopic air bubbles having a size in the range of from about 0.1 mm to about 0.001 mm in the circulating water. As is used in the present invention, the term "nozzle" is defined as any one of a number of means for delivering small gaseous bubbles into a liquid medium. Examples include, but are not meant to be restricted to, small diameter tube used to provide a stream of the gaseous material, a porous sinter to provide a cloud of the the gaseous material, or any one of a number of similar devices well known to practitioners having ordinary skill in the art.

In a preferred embodiment of the present invention, the nozzle and conduit are attached to a return line from the water recirculation filter to the pool. It is also preferred that the microscopic air bubbles have a size in the range of from about 0.01 mm to about 0.001 mm.

BRIEF DESCRIPTION OF THE DRAWINGS

The above and other features and advantages of the invention will become further known from the following detailed description of preferred embodiments of the invention in conjunction with the drawings in which.

DETAILED DESCRIPTION OF THE INVENTION

Figure 1:
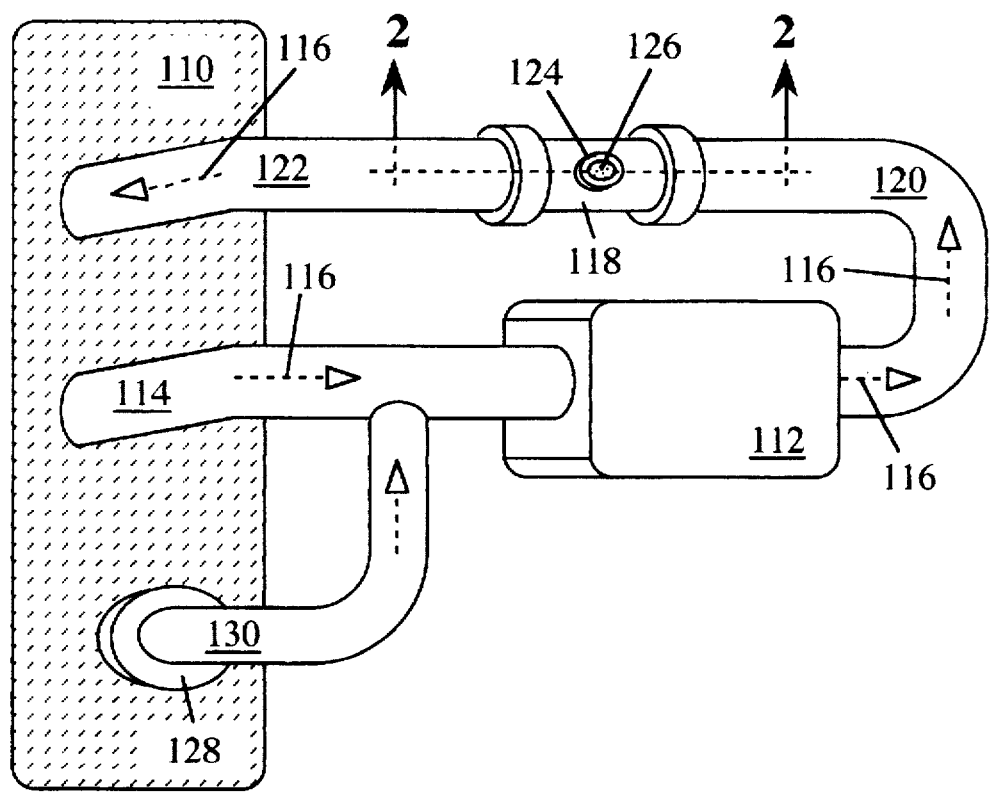
FIG. 1 is a schematic representation of an embodiment of an apparatus for cleaning unwanted materials from a swimming pool according to the present invention.

Referring now to the drawings in which like reference characters designate like or corresponding parts throughout the several views, FIG. 1 shows a schematic representation of an embodiment of an apparatus for cleaning unwanted materials from a swimming pool 110 according to the present invention. A recirculation and filtration apparatus 112 is connected to the pool 110 by a water supply conduit 114. Water from the pool 110 flows into the recirculation and filtration apparatus 112 in the direction of the arrow 116. The pool water is pumped through a filter in the recirculation and filtration apparatus 112 and then moved through an air bubble insertion apparatus 118 through a connection conduit 120. Microscopic air bubbles are inserted into the pool water stream in the air bubble insertion apparatus 118 and the aerated pool water is returned to the pool 110 through the water return conduit 122. The number and size of bubbles inserted into the pool water stream are controlled by the position of the valve handle 124. It is preferred that the microscopic bubbles have a size in the range of from about 0.1 mm to about 0.001 mm. In the illustrated embodiment of the present invention, air is drawn through an air filter 126 prior to injection into the pool water.

In the present invention, it is desired to distribute gas bubbles throughout a swimming pool without major modification to the existing conventional filter and skimmer systems. The velocity of the water in the pool with the filter pump running is low in many regions of the pool. In some locations within a pool the water velocity may be less than one centimeter per second. It is desired that the gas bubbles circulate throughout the pool. Therefore, the bubble size must be small to limit the terminal rise velocity of the bubble. This facilitates movement of the bubbles to all areas in the pool and enhances the performance of the invention. High interfacial area densities are not required in the present application since several hours are available each day to process the water in the pool. Bubble concentrations tested ranged from several hundred per cubic centimeter, which gives the water the appearance of milk, to roughly 100 per liter, which does not affect the appearance of the water. The system works over this entire range of concentrations. However, very small bubbles (i.e.,0.1 mm diameter and less) in concentrations of roughly one per cubic centimeter effectively lift debris and do not appreciably affect the appearance of the pool.

Swimming pools are normally nearly saturated with dissolved gas since the pool surface is constantly in contact with air. The very small air bubbles introduced persist in swimming pools without dissolving as a result of the near saturated condition of the water and because contaminants often found in swimming pool water, such as oils and other organics, migrate to the gas-liquid interface and interfere with diffusion. (Individuals operating water tunnels for hydrodynamic research often find they cannot effectively remove microbubbles from the flow despite having removed dissolved gas from the water.)

Temperature variations in the pool also aid in the persistence of these bubbles and in the effect of the invention. Pool filter systems are often run at night when the pool temperature decreases. The solubility of most gases decreases with decreasing temperature and a pool nearly saturated with air by day may be saturated or supersaturated with air during the night. This allows the smallest bubbles to persist without dissolving. This effect also helps to float debris from the pool in situations where organics in the water are low since bubbles attached to the debris grow during the night due to diffusion from the supersaturated water.

As the microscopic bubbles enter the water of the pool 110, they will circulate throughout the body of the water. Such microscopic bubbles are not visible from the surface of the pool 110 and have extremely long rise times. As the microscopic bubbles contact debris in the pool, they will tend to precipitate on or adhere to the surface of debris in the pool 110. After a period of time ranging from about three hours to about twelve hours, the debris will float to the surface of the pool 110.

As the debris floats on the surface of the pool 110, buoyed by the attached air bubbles, the skimmer 128 removes the debris. The debris is collected in a strainer inside the skimmer 128. Fine debris not captured by the strainer is drawn to the filter through the skimmer conduit 130. The debris collected in the skimmer strainer is eventually removed by the owner of the pool 110. The owner of the pool 110 may remove the debris by using a manual skimmer (not shown).

Figure 2:
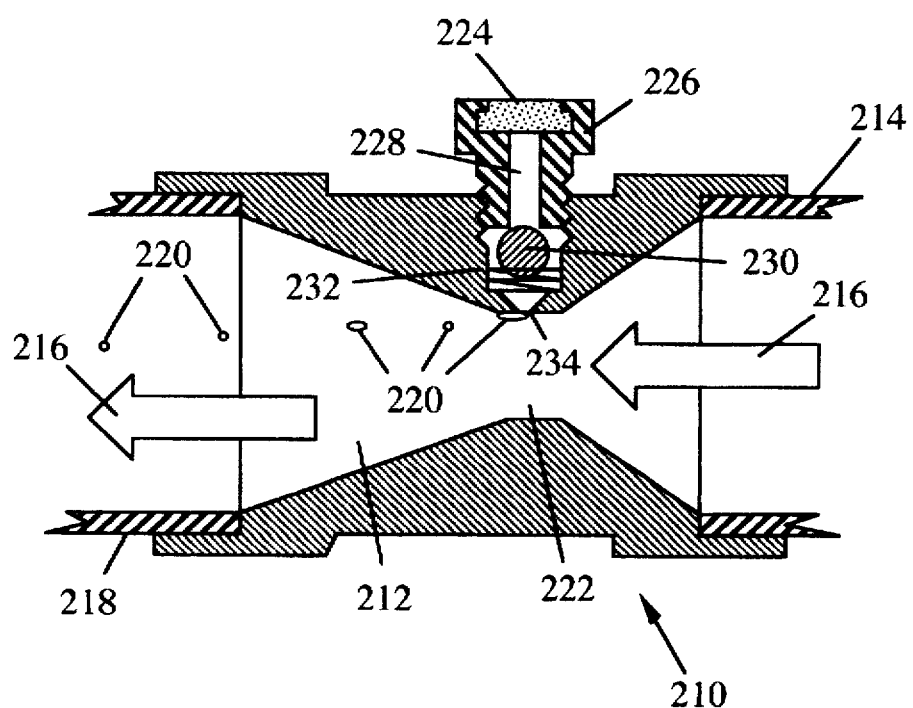
FIG. 2 is a cross-sectional view, taken along the line 2—2 in FIG. 1, of one embodiment of an air bubble insertion apparatus for use in an apparatus for cleaning unwanted materials from a swimming pool according to the present invention.

FIG. 2 is a cross-sectional view, taken along the line 2—2 in FIG. 1, of one embodiment of an air bubble insertion apparatus 210 for use in cleaning unwanted materials from a swimming pool according to the present invention. In this embodiment, the apparatus 210 is inserted in-line with water moving through the filtration apparatus (not shown). Recirculating water 212 enters the apparatus 210 from a connection conduit 214 in the direction shown by the arrows 216 and exits the apparatus 210 through the water conduit 218. The water 212 is then returned to the pool.

The apparatus 210 is a venturi which allows the controlled introduction of microscopic air bubbles 220 into the water 212. The physics of a venturi are well understood to persons having ordinary skill in that art and will not be discussed in detail hereinafter. It is sufficient to say that the pressure of the water 212 at the narrowest part of the venturi 222 is lower that the pressure of the water 212 in the conduction conduit 216 or the water conduit 218. Generally, in this apparatus, the pressure at the narrowest part of the venture 222 is less than one atmosphere.

Air enters the water 212 from the atmosphere by first passing through a filter 224 at the top of a control valve 226. The air then passes through a central conduit 228 of the control screw valve 226 to a ball 230 held in check by a spring 232. As the pressure in the narrowest part of the venturi 222 drops below one atmosphere, air is forced past the ball 230 and out a nozzle 234 which is situated in the flow of the water 212. The control valve 226 adjusts the amount of the air introduced into the water 212. As the valve 226 is screwed in, the pressure required to move the ball increases and less air is introduced. Thus, the user may easily adjust the quantity of microscopic air bubbles 220 in the pool to meet the cleaning needs of the user.

The apparatus 210 is generally constructed of polyvinyl chloride (PVC) in order to match the material of most pool piping. The apparatus 210 is easily installed in-line with the existing pool filtration system by cutting the return line with a straight cut and then inserting the apparatus 210 with an appropriate cement to secure the connection. The apparatus 210 may also be, less effectively, installed in a similar manner in the supply line to the filtration system. However, the passage of the water 212 with the microscopic bubbles 220 through the pool filter will cause many of the bubbles 220 to coalesce or come out of the water 212.

Figure 3:
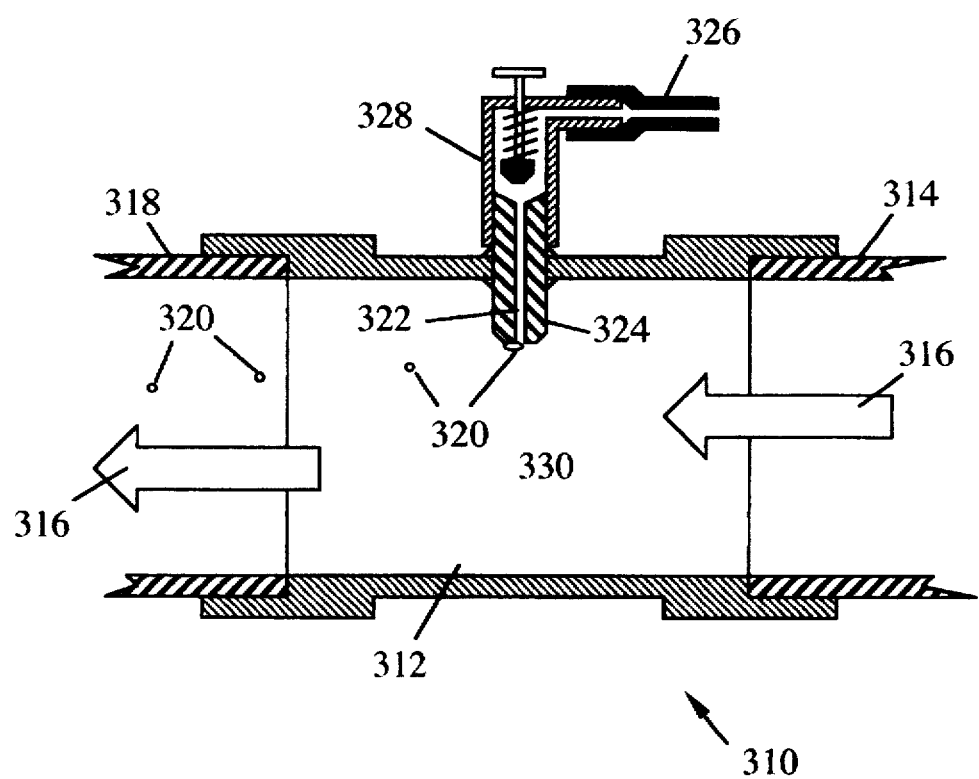
FIG. 3 is a cross-sectional view of a second embodiment of an air bubble insertion apparatus for use in an apparatus for cleaning unwanted materials from a swimming pool according to the present invention.

FIGS. 3 is a cross-sectional view of a second embodiment of an air bubble insertion apparatus 310 for use in cleaning unwanted materials from a swimming pool according to the present invention. In this embodiment, as in the embodiment shown in FIG. 2, the apparatus 310 is inserted in-line between the exit of the recirculation and filtration apparatus (not shown) and the pool. Recirculating water 312 from the recirculation apparatus enters the apparatus 310 from a connection conduit 314 in the direction shown by the arrows 316 and exits the apparatus 310 through the water return conduit 318. The water 312 is then returned to the pool.

Microscopic air bubbles 320 are introduced into the water 312 through a conduit 322 in a member 324 which penetrates the body of the apparatus 310. In this embodiment, the air is supplied by an air supply (not shown) which may be an air pump, compressed air tank or other means of delivering air. The air passes through a connecting hose 326, into a metering head 328, through the conduit 322 and thence into the water 312 through a nozzle 330. A metering valve 332 is used to control the amount of air supplied through the conduit 322 to the nozzle 330 and, therefore, the metering valve 332 is used to control the number of microscopic air bubbles 320 introduced into the water 312. Once again, the user may easily adjust the quantity of microscopic air bubbles 320 in the pool to meet the cleaning needs of the user depending on the amount of debris that enters the pool.

As was discussed above, the apparatus 310 is generally constructed of PVC in order to match the material of most pool piping. The apparatus 310 is easily installed in-line with the existing pool filtration system by cutting the return line with a straight cut and then inserting the apparatus 310 with an appropriate cement to secure the connection. The apparatus 310 may also be, less effectively, installed in a similar manner in the supply line to the filtration system. However, the passage of the water 312 with the microscopic bubbles 320 through the pool filter will cause many of the bubbles 320 to coalesce or come out of the water 312.

Figure 4:
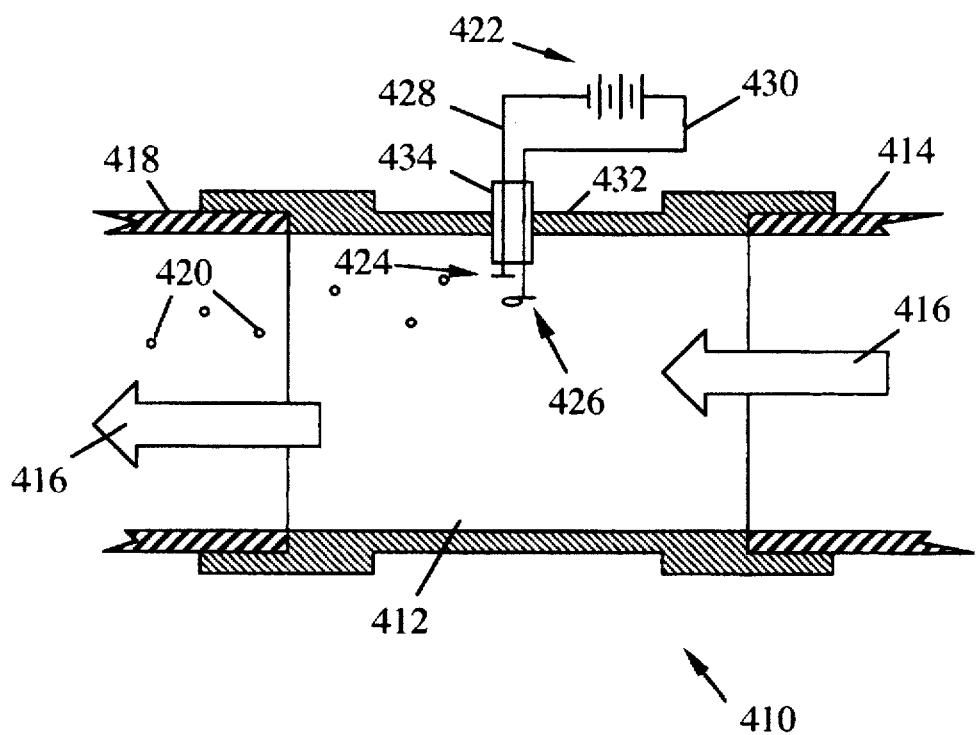
FIG. 4 is a cross-sectional view of a third embodiment of an air bubble insertion apparatus for use in an apparatus for cleaning unwanted materials from a swimming pool according to the present invention.

FIG. 4 is a cross-sectional view of a third embodiment of an air bubble insertion apparatus 410 for use in an apparatus for cleaning unwanted materials from a swimming pool according to the present invention. In this embodiment, as in the embodiments shown in FIGS. 2 and 3, the apparatus 410 is inserted in-line between the exit of the recirculation and filtration apparatus (not shown) and the pool. Recirculating water 412 from the recirculation apparatus enters the apparatus 410 from a connection conduit 414 in the direction shown by the arrows 416 and exits the apparatus 410 through the water return conduit 418. The water 412 is then returned to the pool.

Microscopic air bubbles 420 are introduced into the water 412 by means of electrolysis of the water 412 into hydrogen and oxygen gas. A power supply 422 supplies electric power to a cathode 424 and an anode 426 through the wires 428 and 430. The wires 428 and 430 pass through the wall 432 of the apparatus 410 by means of an insulated member 434. The cathode 424 and the anode 426 are in intimate contact with the water 412. The power supply 422 shown in the present embodiment is a simple battery but any one of a number of well known power supplies may be used for the present invention. Since there is no requirement that the cathode 424 and anode 426 remain constant, either a direct current or an alternating current power supply may be used.

Adjustment of the output of the power supply 422 will change the quantity of the microscopic air bubbles 420 introduced into the water 412. A higher current will produce a higher quantity of bubbles 420 and a lower current will produce a lower quantity of bubbles 420. Thus, the user may easily adjust the quantity of microscopic air bubbles 420 in the pool to meet the cleaning needs of the user depending on the amount of debris that enters the pool.

Therefore, the present invention provides a method and apparatus for cleaning the bottom of a pool of unwanted debris. In addition, the present invention provides such a system which is relatively inexpensive, is relatively easy to install and is relatively easy to operate and maintain.

Having thus described various preferred embodiments of the invention and several of its benefits and advantages, it will be understood by those of ordinary skill that the foregoing description is merely for the purpose of illustration and that numerous substitutions, rearrangements and modifications may be made in the invention without departing from the scope and spirit of the appended claims. For example, the injection of the microscopic air bubbles may occur in a line that takes a small portion of the recirculation flow and bypasses the filter. In addition, it is to be understood that although the illustrated embodiments are directed to a home swimming pool, the present invention is equally adaptable to commercial swimming pools.

The appended claims set forth various novel and useful features of the invention.

What is claimed is:

1. A method for cleaning unwanted materials from a swimming pool having water and a water recirculation filtration system wherein the water circulates through the recirculation filtration system, the method comprising:

(a) placing microscopic air bubbles having a size of in the range of from about 0.1 mm to about 0.001 mm into water circulating through the water recirculation filtration system, (b) circulating the microscopic air bubbles into the water of the swimming pool for a period of time sufficient to precipitate the microscopic air bubbles onto unwanted materials in the pool, (c) allowing the materials to float to the top of the surface of the water, and (d) removing the unwanted materials from the surface of the pool.

2. The method of claim 1 wherein the microscopic air bubbles are circulated into the water of the swimming pool for a period of time in the range of from about three hours to about twelve hours.

3. The method of claim 2 wherein the microscopic air bubbles are circulated into the water of the swimming pool for a period of time in the range of from about six hours to about twelve hours.

4. The method of claim 1 wherein the step of placing microscopic air bubbles into water circulating through the water recirculation filtration system is done after the circulating water passes through the water recirculation filtration system and before the water is circulated back into the pool.

* * * * *